United States Patent
Levi-Setti

[11] 3,899,672
[45] Aug. 12, 1975

[54] SOLAR ENERGY COLLECTION
[75] Inventor: Riccardo Levi-Setti, Chicago, Ill.
[73] Assignee: The University of Chicago, Chicago, Ill.
[22] Filed: Feb. 19, 1974
[21] Appl. No.: 443,615

[52] U.S. Cl. ............... 350/293; 350/200; 350/294
[51] Int. Cl. .......................................... G02b 5/10
[58] Field of Search .......... 350/299, 288, 293, 294, 350/200, 201

[56] References Cited
UNITED STATES PATENTS
| | | | |
|---|---|---|---|
| 804,996 | 11/1905 | Anthong | 350/200 |
| 3,817,605 | 6/1974 | Franklin | 350/288 |

Primary Examiner—Alfred E. Smith
Assistant Examiner—Michael J. Tokar
Attorney, Agent, or Firm—Merriam, Marshall, Shapiro & Klose

[57] ABSTRACT

Disclosed are non-imaging systems and devices for collection and concentration of solar energy including one or more generally conical-shaped bodies having curving inner reflective walls for concentration of energy from a relatively large entrance aperture toward a relatively small exit aperture. Solar energy concentration devices of the invention include "matched" energy traps which receive efficiently the concentrated energy for direct utilization.

10 Claims, 14 Drawing Figures

PATENTED AUG 12 1975     3,899,672
SHEET 2
FIG. 4
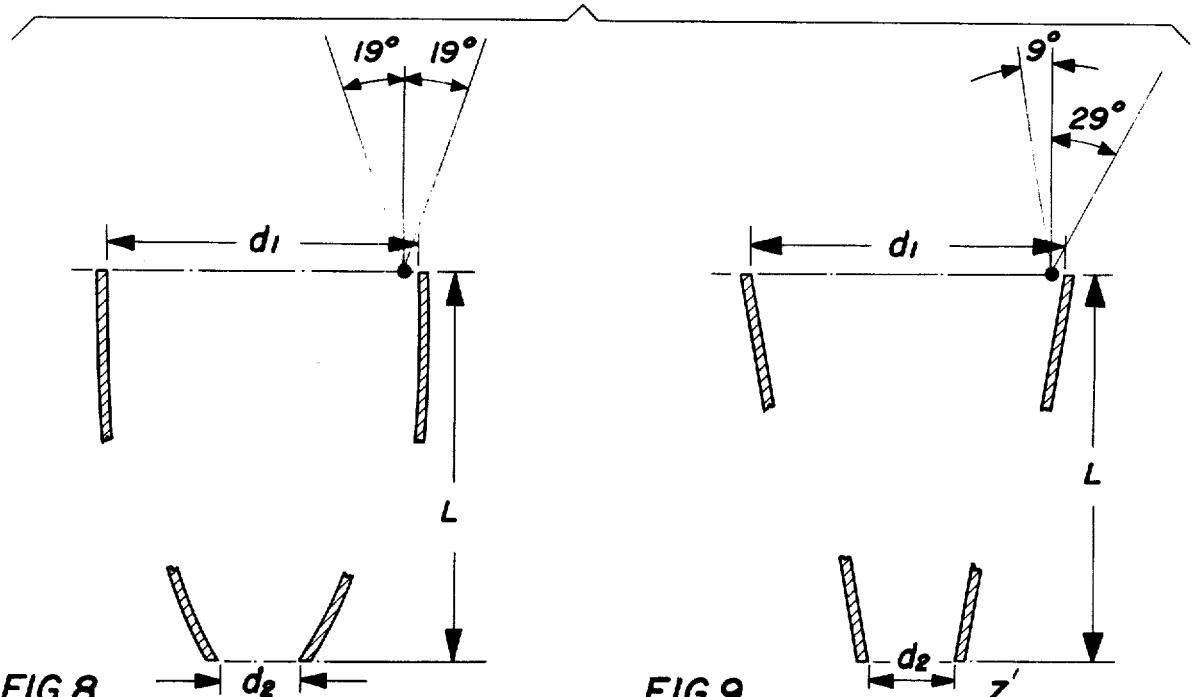
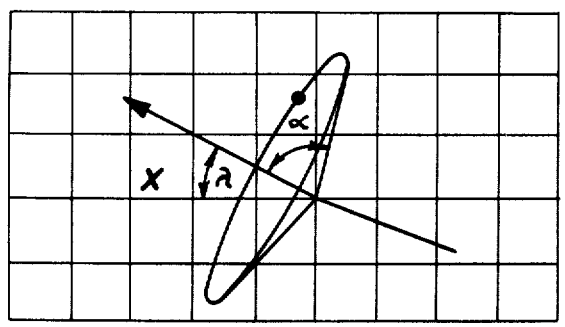
FIG. 8
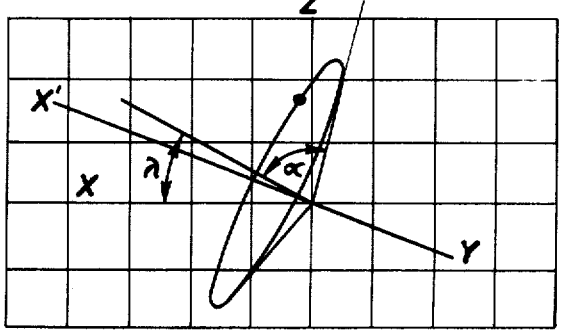
FIG. 9
FIG. 10
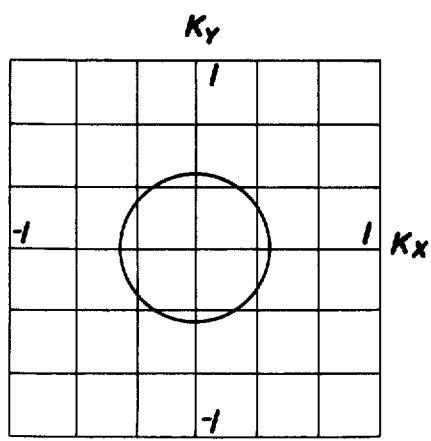
FIG. 11
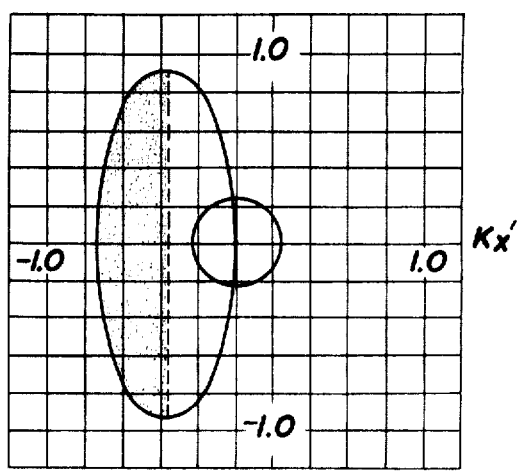

SOLAR ENERGY COLLECTION

BACKGROUND OF THE INVENTION

The present invention relates to devices useful in the collection and utilization of radiant energy from solar sources.

The prior art has proposed numerous devices for detection of electromagnetic energy (e.g., infrared scanners, detectors of light from high energy particles, and the like) and for collection of such energy (e.g., microwave antennas, solar collectors, and the like) and is particularly rich in suggestions of systems for collection and utilization of solar energy.

Notwithstanding the voluminous proposals of the art, among the basic, and as yet inadequately resolved, problems inherent in the efficient utilization of solar energy are avoidance of energy loss through re-radiation (i.e., energy conservation) and avoidance of intricate, and hence costly, apparatus for accurately tracking the sun in its apparent daily motion through the celestial sphere.

A typical attempt to solve solar energy conservation problems involves providing selective coatings on energy absorbing surfaces as well as elaborate insulation of the particular "trap" employed for the utilization of collected energy. U.S. Pat. No. 3,277,884, for example, illustrates such a scheme.

Another common manner of dealing with energy conservation involves including in the collection scheme reflective or refractive concentration apparatus to permit collection of solar energy impinging upon a relatively large area and focusing of collected energy toward a relatively small area of utilization. Typical schemes proposing use of reflector concentrators are illustrated in U.S. Pat. No. 1,814,897, 3,200,820 and 3,217,702, for example. ("Shadowing" effects encountered in disposing an energy utilization body in path of sunlight impinging upon reflectors are to some extent avoided through use of off-axis reflectors, as in U.S. Pat. No. 3,052,229, 3,613,659 and Tabor, "Stationary Mirror Systems for Solar Collectors" Solar Energy, Vol. II, No. 3–4, pp. 27 et seq. (1958)). Typical lens systems for solar concentration are illustrated in U.S. Pat. No. 3,125,091 and Meinel et al., "Physics Looks at Solar Energy" Physics Today, Vol 25, pp. 684 et seq. (1972). All of the mirroring and lens systems proposed above are basically imaging systems wherein solar energy is reflected or refracted to a system focal point at which the "concentrated" energy is utilized for heating or power generation.

Among the solutions proposed for avoidance of diurnal solar tracking is the provision of huge, but marginally efficient, mirrored surfaces such as shown in U.S. Pat. No. 3,179,105.

None of the prior art systems has adequately solved the problems of energy conservation and solar tracking and, to a degree, solution of one problem often tends to enlarge the difficulties posed by the other. This is to say that systems permitting solar concentration by large factors generally will require the most careful and frequent diurnal adjustments for solar tracking. Conversely, systems requiring little or no diurnal adjustment generally provide lowest factors of concentration. Thus, Tabor, infra concludes that the maximum concentration available in a stationary system (i.e., one requiring only seasonal solar tracking) is on the order of 3 or 4.

Non-imaging light funnels having utility in collection of light from high energy particles and having a greater concentration capacity than imaging systems have been proposed in earlier publications, i.e., Review of Scientific Instruments, Vol. 37, No. 8, pp. 1094–5 (1966), ibid., Vol. 39, No. 3, pp. 419–20 (1968), ibid., Vol. 39, No. 8, pp. 1217–8 (1968), and J. Opt. Soc. Am., Vol. 60, No. 2, pp. 245–7 (1970). Also noted has been similarity between such funnels and the geometry of retinal cones in J. Opt. Soc. Am. Vol. 61, No. 8, pp. 1120–1 (1971). The inventor further noted the similarity between structures of this type and elements of the compound eye of the horseshoe crab, Limulus Polyphemus, See, e.g., U. of Chicago Div. of Phys. Sciences Reps., Vol. 21, No. 1, pp. 4–5. Basically, the above publications dealt with proposals for "ideal", conical-shaped, light collectors which approach an f number equal to 0.5, a physically unrealizable limit for lens systems.

SUMMARY OF THE INVENTION

According to the present invention a non-imaging system of exceptional efficiency is provided for the collection, concentration, and utilization of solar electromagnetic energy. Comprehended by the invention are devices including one or more generally conical-shaped collection structures having inner reflective surfaces which function to guide and concentrate radiant energy impinging upon a relatively large entrance opening toward -- and if desired, through -- a relatively small exit opening at which there may be disposed a trap for utilization of the concentrated energy. Preferred embodiments of the devices of the present invention include such collection structures in combination with "matched" energy trap cavities to provide high energy concentration (and hence achievement of high temperatures and optimal energy conservation) with minimal solar tracking.

Alternative embodiments may include structural elements adapted to provide for minimization of re-radiation losses.

Further aspects and advantages of the present invention will become apparent upon consideration of the following description thereof, reference being made of the following drawing.

BRIEF DESCRIPTION OF THE DRAWING

FIG. 4 is a comparative graphic representation of relative fields of acceptance.

FIG. 8 is a graphic representation of relative solar motions.

FIG. 9 is a variant form of FIG. 8.

FIG. 10 is a graphic representation of the acceptance of a collector of the invention in terms of optical direction cosines.

FIG. 11 is a graphic representation of relative solar motion compared to the field of acceptance of a collector of the present invention.

DETAILED DESCRIPTION

Figure 1:
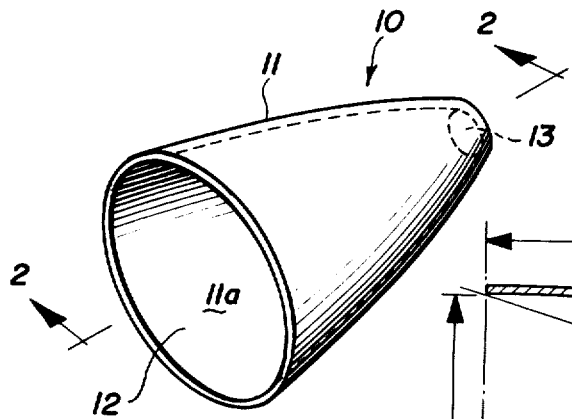
FIG. 1 is a schematic representation of a solar energy collection element according to the present invention.

FIG. 1 illustrates an embodiment of a solar energy collector element of the present invention including a generally conical-shaped body 10 including wall element 11, the inner surface 11a of which is of energy reflective material. As shown, wall element 11 tapers from an entrance aperture 12 to an exit aperture 13.

Figure 2:
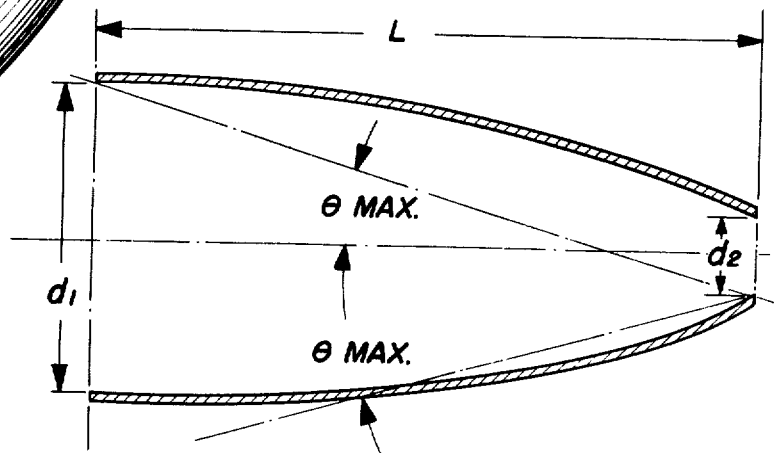
FIG. 2 is a sectional view taken along line 2—2 of FIG. 1.

The optical properties of collection elements of the type shown in FIG. 1 is best illustrated through consideration of FIG. 2, wherein a preferred embodiment of a collector is seen to have an entrance aperture of a diameter $d_1$, an exit aperture of a diameter $d_2$, an overall height L, an optical axis designated OA, and a half field of view, designated $\theta$. The optical axis of the body is defined by a line extending from the center of the entrance aperture to the center of the exit aperture. The half field of view of the body is defined for the purposes of the present invention as the angle formed by the intersection of the optical axis and a straight line connecting a point on the edge of one aperture with a laterally (180°) opposed point on the edge of the other.

A property common to all collection elements of the invention is the "field of acceptance" which is defined as that three dimensional field from within which radiant energy (rays) impinging upon a given point in the plane of the entrance aperture will reach the exit aperture either directly or by way of one or more reflections from the element's inner reflective surfaces. Put another way, rays generated within the field of acceptance of a collector and reaching the entrance plane will invariably reach the exit aperture and those rays generated outside the field will not.

For the purposes of the present invention, the shape of wall element 11 as revealed by a median cross sectional view of collector body 10 will be known as the "profile curve" of the element. Accordingly, the profile curve of a side wall element of a collector constructed according to the present invention may, for example include symmetrical pairs of any substantially smooth, non-convex lines (connecting laterally corresponding edge points of exit and entrance apertures) but not including pairs of straight lines (as illustrated at the right of FIG. 4). Preferred parabolic lines as shown in FIG. 2 are described in greater detail hereafter. Concave curving lines of length greater or less than those above-mentioned parabolic lines are also contemplated.

The following aspects of the preferred embodiment of FIG. 2 are of particular interest in understanding the invention.

1. The concentrative capability of the collector, i.e., the ratio of exit aperture diameter $d_2$ to entrance aperture diameter $d_1$, is equal to one over the square of the sine of the half field of view ($\theta$) of the cone.

2. The height L, of the collector is equal to one-half the sum of $d_1$ and $d_2$ multiplied by the cotangent of the half field of view.

3. The profile curve of wall element 11 reveals sections of parabolas having as their focus the laterally opposed edge of the exit aperture and as their axis a line forming an angle with the optical axis of the body equal to the half field of view ($\theta$) of the body.

Figure 3:
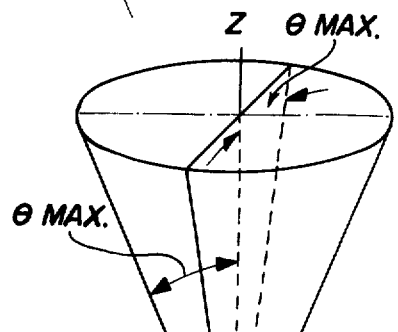
FIG. 3 is a graphic representation of the field of acceptance of a collection element as shown in FIGS. 1 and 2.

4. The embodiment accepts for concentration all energy deriving from within an average right circular conical field of acceptance developed by the geometric accumulation of all conical fields of acceptance at all points within the plane of the entrance aperture, the parameters of each of said several fields being as follows (See FIG. 3):

a. The apex of the cone is any point, P, in the plane of the entrance aperture;

b. The axis of the cone is a line parallel to the optical axis of the body; and, c. The angular opening of the cone subtends an angle equal to the half field of view ($\theta$) of the body.

It is especially noteworthy that the field of acceptance of the embodiment is identical at each and every point, P, in the plane of the entrance aperture. This being the case, the field of acceptance is not subject to substantial failure or diminution at the edges of the collector and the maximum angle of acceptance, i.e., the angular acceptance of the entrance aperture, $\theta_{max}$, of the collector is quantitatively equal to the angle of the half field of view ($\theta$).

Further illustrative of such a collector's properties is the comparison of its efficiency to that of a perfectly absorbing flat surface for isotropic radiant energy impinging on the entrance aperture at all angles up to 90° with respect to the optic axis. The ratio of energy per second per unit area accepted by the collector to the energy per second per unit area accepted by the absorbing surface is equal to the collector's concentrative capability (the ratio of exit aperture width, $d_2$, to entrance aperture width $d_1$).

In practice, numerous departures from the dimensional relationships present in FIGS. 1 and 2 may be made in the construction of a collector element which will yield satisfactory, albeit perhaps less than ideal, overall results. For example, it may be noted that in FIG. 2 wall 11 terminates at a point wherein a line tangent to its parabolic curvature would lie parallel to the optical axis. It may be desirable in some embodiments to provide a truncated collector element having a height less than that of FIGS. 1 and 2 and in such cases wall 11 would terminate short of the above-mentioned point.

It may be expedient to increase the overall height of the collector by linearly extending reflective side wall 11a beyond the entrance aperture and parallel to the optic axis (forming a cylindrical extension). Such virtual extension of the entrance aperture away from the exit aperture does not serve to alter the angular acceptance of the collector but may diminish the collector's efficiency because of resultant multiple reflections. It may further be expedient to provide linear "transition" reflective wall segments extending away from the edges of the exit aperture, either parallel to the optic axis or preferably tapering slightly outwardly, to accommodate transmission of rays passing through the exit aperture toward a photocell or the like.

Similarly, it is likely that a collector might be more economically fabricated in a nearly right circular conical form more closely approximating that illustrated in cross section at the right of FIG. 4. As might be predicted from known two dimensional analyses of optical collection properties of right circular cones (see, e.g., Williamson, "Cone Channel Condenser Optics" J. Opt. Soc. Am., Vol. 42, No. 10, pp. 712–15 (1952) and, White, "Cone Channel Optics" Infrared Physics, Vol. 5, pp. 179–85 (1965)), a considerably more diffusely defined field of acceptance exists for such a structure, owing to the fact that the maximum angle of acceptance for given points in the plane of the entrance aperture is subject to variance depending upon relative transverse distance from the optical axis. This fact may be best illustrated through consideration of the following hypothetical example illustrated schematically in FIG. 4.

EXAMPLE I

Assume the construction of a first collector element according to FIG. 1 wherein the ratio of $d_1$ to $d_2$ (and hence the concentration factor) is 9.6 and further that the half field of view equals approximately 19°. The height (L) of the collector would be a fixed dimension according to the relationship described above, i.e., $L = \frac{1}{2}(d_1 + d_2) \cot \theta_{max}$. The maximum angle of acceptance at all points in the plane of the entrance aperture would be equal to 19°. In particular, radiant energy impinging upon a point, $P_1$, near the outermost edge of the entrance aperture would reach the exit aperture if if impinged upon $P_1$ from an angle of less than about 19° in either direction measured transversely to the cone optical axis.

Assume further the construction of a second collector of the right circular conical form illustrated in transverse section at the right of FIG. 4 having dimensions $d_1$, $d_2$ and L identical to those first of the collector. The second collector would, of course, provide the same theoretical concentration of isotropically impinging energy but the field from which energy could be gathered would be much less sharply defined. Energy impinging upon a point, $P_1$, near the outermost edge of the entrance aperture would be channeled to the exit aperture only if it impinged upon $P_1$ from an angle of less than about 9° measured transversely to the optical axis in one direction or less than about 29° from the opposite direction.

Use of straight or substantially straight side wall element as shown at the right of FIG. 4 would give rise to acceptance of energy from marginal angles only after multiple reflections with consequent energy loss due to absorption by less than ideally reflective surfaces.

While collection cones of the invention preferably include a smoothly curving side wall, it is anticipated that some economic advantage in fabrication might be derived through use of walls having one or more segments revealed in profile curve as straight lines.

Figure 5:
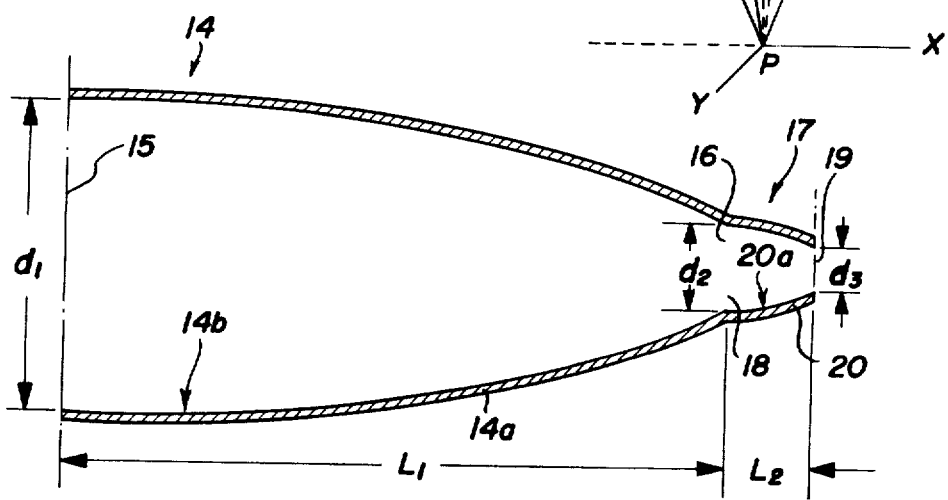
FIG. 5 is a longitudinal median cross sectional view of an alternative collection element according to the invention.

FIG. 5 illustrates in cross section a tandem cone collector element which, under circumstances hereafter described, may provide greater factors of concentration than provided by a single collector element. In the embodiment shown, there is a first conical element 14 having respective entrance and exit apertures 15 and 16, as well as wall element 14a having an energy reflective inner surface 14b. Contiguous to exit aperture 16 is a second conical element 17 having an entrance aperture 18 of a diameter equal to aperture 16 and an exit aperture 19, as well as wall element 20 having an energy reflective inner surface 20a. Element 14 is filled with a medium having a refractive index, $n_1$ (e.g. air, which has a refractive index of approximately 1.0), and element 17 is filled with a material having a refractive index, $n_2$, greater than $n_1$ (e.g., lucite, which has a refractive index of approximately 1.5).

In understanding the operation of the embodiment of FIG. 5, it should be noted that an energy concentrator of the type of collector FIG. 1 functions in part to reflect energy from within the collector's field of acceptance to the exit aperture. In practice, some energy will directly reach the exit aperture at an angle parallel to the optic axis of the collector while, at the opposite extreme, some energy will reach the plane of the exit aperture at a grazing angle of nearly 90°. To further concentrate such grazing energy toward a tandem second collector exit aperture requires both the refractive capacity of a medium of greater index of refraction than that filling the first collector and an angular field of acceptance for the second collector equal to the critical angle of its medium. With this in mind, the operation of a tandem collector will be best understood through consideration of the following hyopthetical example.

EXAMPLE II

Assume one wished to concentrate radiant energy to a circular photoelectric surface of an instrument having a diameter $d_3$, equal to 1 inch. Assume further that one wished to concentrate energy from an angular field of acceptance of half angle equal to 16°. To accomplish such a result one might construct a single cone collector as shown in FIG. 1 filled with a medium having an index of refraction of 1. Since the exit aperture dimension is 1 inch and the desired maximum angle of acceptance is 16°, the entrance aperture transverse dimension and overall height of the trough may be derived from the relationships heretofore described i.e., the ratio of transverse exit aperture dimension to entrance aperture dimension equals the sine of the half field of view (which for the collector of FIG. 1 equals the maximum angle of acceptance), and, the overall height of the collector equals half the sum of the entrance and exit aperture diameters multiplied by the contangent of the half field of view. The diameter of the entrance aperture would thus equal 3.6 inches. The concentration factor of the collector would be equal to 13.

One might instead construct a tandem collector as in FIG. 5 wherein the first element 14 was filled with a medium having an index of refraction $n_1$, of 1, the second element 17 was filled with a second medium having an index of refraction, $n_2$, of 1.5 and the photoelectric surface was in optical contact with the second medium. The maximum angle of acceptance (critical angle) for element 17 would be equal to the inverse sine of the index of refraction of the medium filling element 14 divided by the index of refraction of the medium filling element 17, i.e. $\theta_{max}$ = arc sine $n_1/n_2$ = sine 1/1.5 = arc sine 0.666 = 42°. Given dimension $d_3$ of exit aperture 19 equal to 1 inch and maximum angle of acceptance equal to 42°, $d_2$, the diameter of the entrance aperture 18 would be equal to 1.5 inches and the overall height would be 1.4 inches. With respect to element 14, since the exit aperture 16 diameter is equal to 1.5 inches and the desired maximum angle of acceptance is equal to 16°, the diameter, $d_1$, of the entrance aperture 15 would be 5.4 inches and the overall height would be 12 inches. The concentration provided by element 14 would be factor of 13 and the concentration of the entire tandem system would be equal to $(1.5)^2$ times 13, or 29.

Finally, it may be noted that approximately the same concentration may be derived through use of a single collector in optical contact with air ($n_1$ approximately equal to 1) at the entrance, but filled with a medium of $n_2 = 1.5$ and having $\theta_{max}$ equal to 10.6° and other dimensions according to the relationships above described.

According to the invention, there are proposed systems for collection of solar energy which include radiant energy collector-concentrators as above described. The inherent attractiveness of directly using solar light to meet man's energy needs has motivated an intense search for practical solar power schemes. For most of these, it is necessary to concentrate the sun light by at least an order of magnitude in order to achieve high temperatures. This poses no problem in principle because the rays of sunlight are quite parallel (the half-angle $\theta_s$ subtended by the solar disk is only 1/4°) provided one tracks the sun's location in the sky with an accuracy comparable to $\theta_s$. Because of the formidable technical problems associated with tracking to this precision, it would clearly be an enormous advantage if the required concentration was achievable by a relatively stationary collector, i.e., one requiring little or no diurnal movement. This possibility was, in fact, explored in Tabor, infra, and the disappointing conclusion was reached that the maximum possible concentration obtainable by a stationary collector was 3 or 4. This result has been generally accepted to the present time. However, Tabor's analysis was based on conventional imaging optics and pre-dated the inventor's more recent application of non-imaging light funnels to solar energy concentration, where a greater concentration than with imaging systems can be achieved in semi-stationary collecting schemes.

Inasmuch as it is desired to concentrate solar radiation with ground based collectors, it is convenient for the purposes of discussing solar tracking problems to adopt a "Ptolemaic" description of the sun's motion in the sky. To an adequate approximation, the apparent motion of the sun as viewed from a fixed point on earth, describes the cone depicted in FIG. 8. In this figure the X axis direction is along north, the Y azis direction along west and Z axis direction along the vertical. The cone axis is in the X, Z plane, inclined at angle γ, which is the latitude. The cone opening angle, α, is the angle between the earth's axis of rotation and the earth-sun direction. Since the earth's axis is inclined at an angle of approximately 23.5° with respect to the normal to the plane of its orbit (the ecliptic plane), the angle varies between the approximate limits 66.5° ≤ α ≤ 113.5° during the course of a year. Except at a time of equinox, when α = 90° and the apparent solar path describes a great circle wherein the sun does not "rise" or "fall" in the vertical, the problem of collecting solar light is non-trivial and becomes most demanding at solstice ( α = 90° ± 23.5°). Collection and concentration of solar light by high factors at the time of solstice for a reasonable fraction of the day, say 6 to 8 hours, may be considered the fundamental problem of solar collection. This is so because at such times the apparent "rise" or "fall" in the vertical requires following or tracking the solar disk "upwardly" about 12° within the three or four hours prior to its reaching the zenith (noon) position and "downwardly" about another 12° within three or 4 hours after its reaching the zenith position. Clearly, a stationary collector which would continuously accept direct solar radiation throughout an important fraction of the period of the above-mentioned ±12° excursion during the time before and after reaching the noon position, and which further was capable of high orders of concentration, approaches the ideal in solar energy collection. The extent to which collectors of the invention approach this ideal is set forth hereafter.

The acceptance of a collector as shown in FIG. 1 may be described using optical direction cosines KX, KY, KZ (See FIG. 10) where, for a constant index of refraction, we may take $\vec{K}$ as the unit energy ray direction. KX, KY become true Hamiltonian variables conjugate to X, Y when the light ray trajectories are parameterized by Z. Here, Z is measured along the optic axis of the collector. Hence $$\int dX dY \, dKX dKY \text{ is conserved}$$

$$Z = \text{constant}$$

The acceptance of such a collector in the KX, KY plane, is described by the equation $$KX^2 + KY^2 \leq \sin^2\theta_{max}$$

or $$\frac{KX^2}{\sin^2\theta_{max}} + \frac{KY^2}{\sin^2\theta_{max}} \leq 1$$

Thus the acceptance fills a circle of radius equal to $\sin\theta_{max}$ as shown in FIG. 10.

(It may be recalled at this point that the collector concentrates by a factor of $1/\sin^2\theta_{max}$.)

It is easily shown that the apparent motion of the sun in the KX, KY plane is an ellipse. A convenient way to visualize this is to reconsider FIG. 8 and take as the Z' direction the zenith (highest point of the sun in the sky, or noon) keeping the Y' direction West as before. (See FIG. 9).

Clearly, the projection of the cone on the X', Y' plane is an ellipse, and $$-\sin 2\alpha \leq KX' \leq 0$$

$$-\sin\alpha \leq KY' \leq \sin\alpha, \, KY' = KY$$

or, in terms of T= π/2 − α, -Sin 2T ≤ KX' ≤ 0, − cosT ≤ KY' ≤ cosT. Hence, the semi-minor axis = $a = \frac{1}{2} \sin^2\alpha = \frac{1}{2}\sin 2T$ and the semi-major axis = $b = \sin\alpha = \cos T$.

FIG. 11 shows the ellipse described by the sun on a solstice, the most difficult period for collection. On the same figure has been added the acceptance of a $\sin\theta_{max} = 0.1$ collector which concentrates the sunlight by a factor 100. Clearly, such a collector accepts a sizable portion of the useful day at solstice, or effectively at any other time of the year, in view of the geometry in FIG. 11.

More rigorously, in the coordinate system chosen, the solar ellipse will always traverse the circle of the collector acceptance through the center of the latter. (this is achieved in practice by pointing the collector axis toward the zenith).

Introducing a phase angle $\phi$ for the solar ellipse, where $\phi = 2\pi$ (= 360°) corresponds to the 24 hours day, we find for the intersection of the circle with the ellipse $$\tan \phi = \frac{\sin \theta_{max}}{\cos T}$$

with $$T = \frac{\pi}{2} - \alpha$$

as previously defined. Therefore, the accepted number at daylight hours is given by $$\text{Number of hours} = 2 \, (\phi/2\pi) \, (24) = \left(\frac{\phi}{\pi}\right) (24)$$

where the factor 2 results from the fact that $\sin \theta_{max}$ represents the "semi-angle"" of acceptance resulting in the final expression, $$\text{Number of hours} = \frac{24}{\pi} \text{arc tan} \frac{\sin \theta_{max}}{\cos T}$$

Table 1 below approximates the number of accepted hours of sunlight for a collector with $\theta_{max} = 19°$ (concentration factor, 9.6) throughout the year in the approximation of a point-like sun.

TABLE I

| Season | T | Tan $\phi$ | $\phi$ | Collected hours without tracking |
|---|---|---|---|---|
| Equinox | 0 | 0.326 | 18° | 2.4 |
| Solstice | 23.5° | 0.354 | 19.5° | 2.6 |

The number of collected hours is practically independent of season and depends only on the acceptance semi-angle, $\theta_{max}$.

Use of a concentrator as in FIG. 5 which includes tandem cone collectors wherein $n_1$ equals 1 and $n_2$ equals approximately 1.5 would result in achieving a concentration factor of ~21. Table II below illustrates approximate concentration factors for collectors having $\theta_{max}$ within the range of 2° to 30° along with approximate totals of hours of sunlight which may be collected without tracking or realignment of the collector at solstice, in the approximation of a point-like sun.

TABLE II

| $\theta_{max}$ | $\phi$ (degrees) | Concentration Factor | Hours Collected |
|---|---|---|---|
| 40° | 35 | 2.4 | 4.7 |
| 30° | 28.5 | 4 | 3.8 |
| 20° | 20.5 | 8.5 | 2.7 |
| 18° | 18.5 | 10.5 | 2.45 |
| 16° | 16.6 | 13.1 | 2.2 |
| 14° | 14.7 | 17.1 | 1.95 |
| 12° | 13.1 | 23.1 | 1.75 |
| 10° | 11.0 | 33.1 | 1.45 |
| 8° | 8.6 | 51.6 | 1.15 |
| 6° | 6.5 | 91.1 | 0.87 |
| 4° | 4.4 | 205.3 | 0.58 |
| 2° | 2.1 | 820 | 0.28 |

It may be noted that as the angular acceptance of the collector diminishes, the concentration factor increases and the number of hours of sunlight which can be collected decreases. This inherent property permits flexibility in solar energy collection to fit the requirements of a given environment or a given utilization scheme. Thus, when very high temperatures are desired, it may be preferable to employ a small angular acceptance to achieve high concentration even though a small number of hours of sunlight might be collected between realignments. Alternatively, it may be desirable to collect at lower concentration for a longer average period of time and in such a case a larger angular acceptance would be preferred.

It should be noted that variations in the profile curve of collector side walls departing from that shown in FIG. 2 may give rise to diminished, though still advantageous, concentrative capacity for a given angular acceptance and/or diminished, though still advantageous, time spans for collection of direct sunlight at solstice and/or diminished, though still advantageous, total energy collection due to energy loss through multiple reflections.

Figure 12:
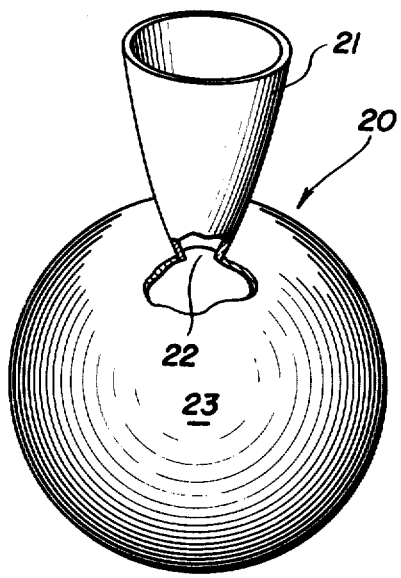
FIG. 12 is a schematic view of a solar energy collection device according to the present invention.
Figure 13:
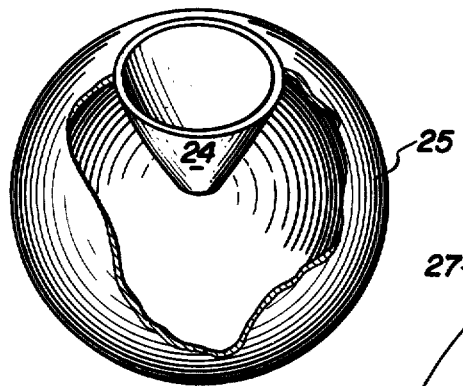
FIG. 13 is a schematic view of an alternative solar collection device.
Figure 14:
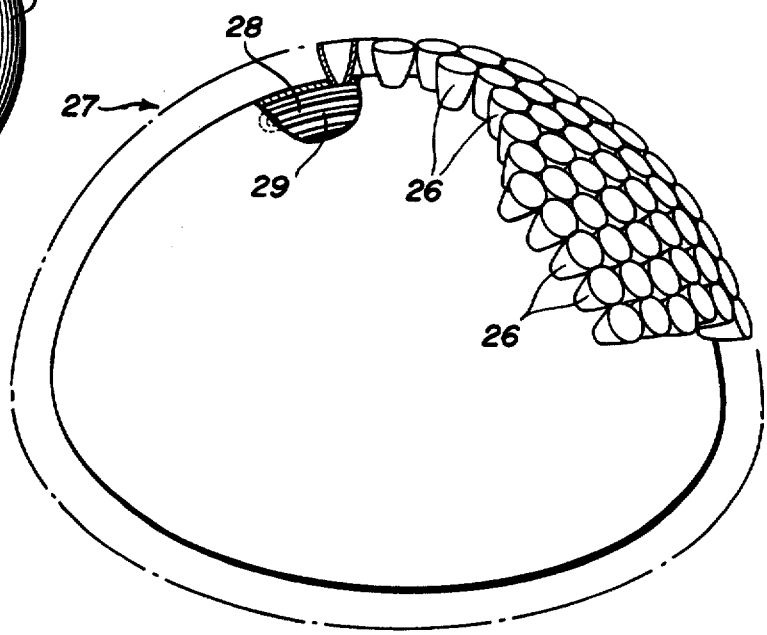
FIG. 14 illustrates a solar energy collection scheme according to the invention.

FIGS. 12, 13 and 14 illustrate solar energy collection devices of the present invention which generally comprise one or more collector-concentrator elements as in FIG. 1 and a solar energy trap. As used herein, the term "trap" includes any apparatus having a capacity for accepting radiant energy of various wavelengths either for direct utilization of such energy or as an intermediate in such utilization. As such, the term includes, but is not limited to, such direct utilization devices as photo- and thermoelectric cells, as well as simple "black body" cavities and variant cavity structures such as are disclosed in the National Science Foundation publication NSF/RANN/SE/GI-34871/PR/72/4.

FIG. 12 shows a simple solar energy collector 20 with a collector-concentrator 21 as in FIG. 1 having contiguous to its exit aperture 22 a generally spherical energy receiving body 23.

Figure 6:
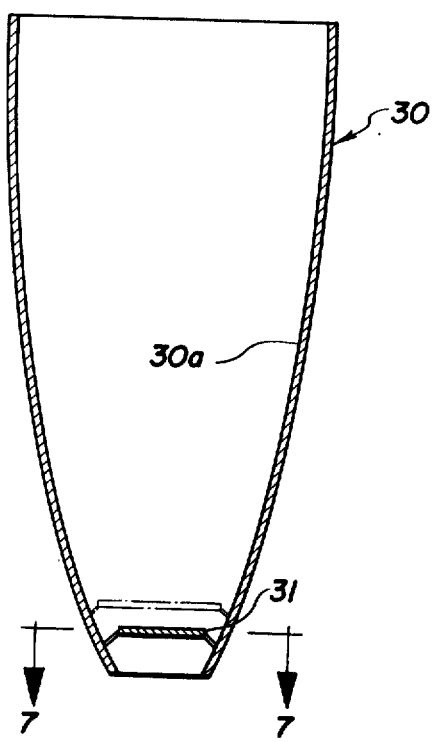
FIG. 6 is a sectional view of an alternative embodiment of a collection element according to the invention.

FIG. 13 illustrate an alternative to the embodiment shown in FIG. 6, wherein an entire collection element 24 is disposed within spherical body 25.

FIG. 14 illustrates a solar energy collection scheme including a plurality of conical collection elements 26 in edge to edge relationship forming a portion of a dome-shaped structure 27. In the enclosed space 28 beneath elements 26 may be disposed one or more coil elements 29 or similar structures in which a fluid may circulate for utilization of heat energy entering space 28 from elements 26. Clearly, a domed structure as in FIG. 14 might be constructed in such dimensions as to provide a large solar-heated living space. A structure of this type would be particularly well suited for collection of diffused light if such collection is desired.

A film of a transparent material such as glass may be disposed at the entrance openings of elements 26 for the purpose of protecting inner side wall surfaces from dust and the like. Due to known selective reflective properties (greenhouse effect), the use of an iron-free glass film may be particularly advantageous in selectively preventing re-radiation of infrared energy by reflecting a portion of re-radiated infrared back toward its exit aperture source.

With respect to the collectors above discussed, it should be noted that a significant problem of fundamental relevance in solar energy applications is that of transferring the solar radiation to a receiver best suited for its conversion into useful energy forms. In concentration schemes involving conventional mirror systems, the receiver is placed at the focus of the device, which is generally located within the volume defined by the reflecting surface itself. Among the disadvantages of this arrangement is that the receiver intercepts the incident radiation, casting a shadow on the mirror, and physical dimensions of the receiver and therefore seriously limited.

One of the physical properties of ideal light collectors removes the above difficulties in that the radiation collected is in fact conveyed to the exit aperture in a funnel-like action and can be captured by a very simple matched receiver. As illustrated in FIGS. 12 and 13, the exit aperture of an ideal collector is inserted into a spherical cavity. All radiation emerging (mostly at larger angle to this axis) from the collector element is thus trapped inside the spherical receiver which, provided with a preferably irregular, good reflecting internal surface, acts as a black body cavity.

Clearly the energy stored in the receiver in the form of black body radiation can be tapped in many conventional ways, without the need for special technologies. It should be emphasized that the cavity already contains useful heat, which can be directly used to perform a variety of functions inside the receiver itself. Of interest is of course the equilibrium temperature which can be achieved within the cavity. In the absence of external load and thermal losses, the cavity will reach thermodynamic equilibrium with the source through reradiation through the collector element exit aperture. The maximum temperature which can be reached inside the cavity with an open aperture is obtained by equating the ingoing and outgoing radiation powers and applying Stefan-Boltzmann law. In this crude calculation the assumption is made that the sun radiates as a black body at temperature $T_o$ and that the collector element aperture reradiates into space as a black body at temperature T.

Expressing the result in terms of the collector concentrating power X and the angle $\alpha$ subtended by the sun at the earth surface, we have $$T = T_o \sqrt{\sin\alpha} \; X^{1/4}$$

As an example, for X = 10, $T_o$ = 6000°K, the theoretical equilibrium temperature reached inside the cavity would be T = 736°K. It should be emphasized that losses due to e.g. atmospheric absorption will reduce this temperature by the ratio ($P_o/P_{abs}$) of the incident power $P_o$ with no absorption to the actual power received $P_{abs}$. In order to reach higher black body temperatures, or to offset various types of losses, a window having a ratio of absorptivity to emissivity a/e greater than 1 may be placed at the entrance to the cavity.

Figure 7:
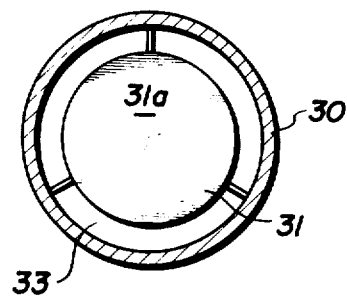
FIG. 7 is a view taken along line 7—7 of FIG. 6.

According to another aspect of the invention, as illustrated in FIGS. 6 and 7, structures may be provided within collector elements whereby re-radiation losses may be substantially diminished. In FIG. 6, there is shown in cross section a collector element 30 having centrally disposed therein a disc-shaped "stop" element 31 having an energy reflective inner surface 31a, secured in place by support elements 32. Stop 31 may be disposed in a number of alternate positions and may have differing dimensions as shown in phantom lines. In use the stop would, of course, block some direct solar energy from passing through the exit aperture and into a utilization cavity. Energy passing through the annular region 33 between the stop and collector element reflective inner walls 30a and into a spherical cavity as in FIG. 12 is highly anisotropic, making such a cavity a natural "match" for the collector element. Stop element 31 would function to reflect back into the cavity part of the energy which is re-radiated isotropically out of the cavity in the ordinary course of reaching and maintaining thermal equilibrium.

Use of a stop element as above described is thus seen to provide a distinct advantage in diminishing reradiation and thus providing higher overall temperatures in the cavity which may more than compensate for the additional difficulty which may be involved in providing such diurnal solar tracking as may be necessary to ensure adequate solar energy collection through the annular region 33 during the course of the day.

Obviously many modifications and variations of the invention will occur to those of ordinary skill in the art and therefore only such limitations as appear in the appended claims should be applied thereto. It is contemplated that devices may be constructed according to the present invention which include an array of collector elements disposed in such a manner as to collect substantially all available solar energy in the course of a given day and may include apparatus for selectively closing (to avoid re-radiation losses) exit apertures of collector elements during such times as the collectors are not in position to collect direct sunlight.

What is claimed is:

1. Apparatus for use in collection and utilization of solar energy, said apparatus comprising:

at least one generally conical-shaped, non-imaging, primary solar energy concentrator element, said element including a substantially circular solar energy entrance aperture of a diameter $d_1$, a substantially circular solar energy exit aperture spaced apart from said entrance aperture and having a diameter $d_2$ which is less than the diameter $d_1$ of said entrance aperture, and solar energy reflective wall means extending from said entrance aperture to said exit aperture for directing solar energy entering the element at said entrance aperture toward said exit aperture, the profile curve of said wall means revealing symmetrical substantially concave curved segments, said solar energy concentrator element comprising means, including the dimensions of said apertures, the distance separating said apertures and the curvature of said wall means, which permits concentration of solar energy by a factor of $(d_1/d_2)^2$ with the concentration element in a fixed position and without tracking of apparent solar motion, for a time period, in hours, equal to, $(24/\pi)$ arc tan (Sin $\theta_{max}$/cos T)

wherein: $\theta_{max}$ is the half field of view of the concentrator element, and T is equal to $\pi/2$ minus the angle, $\alpha$, between the earth's axis of rotation and the earth-sun direction;

and a hollow solar energy trap means disposed at said exit aperture of said concentrator element.

2. Apparatus as set forth in claim 1 wherein the concave curved segments revealed by the profile curve of said wall means are parabolas, each having as its focus the opposite edge point of said exit aperture and as its axis a line forming an angle with the optical axis of the concentrator element equal to the half field of view of the concentrator element.

3. Apparatus as set forth in claim 1 wherein the distance separating said entrance and exit apertures is no more than one half the sum of the diameters of said apertures multiplied by the cotangent of the half field of view of the concentrator element.

4. Apparatus as set forth in claim 1 wherein the ratio of diameters of the exit aperture to the entrance aperture is one over the square of the sine of the half field of view of the concentrator element.

5. Apparatus as set forth in claim 1 wherein said solar energy trap means is a generally spherically shaped body having an entrance opening.

6. Apparatus as set forth in claim 5 wherein said entrance opening of said body is contiguous to said exit aperture of said collector element.

7. Apparatus as set forth in claim 5 wherein the internal surface of said body is solar energy reflective.

8. Apparatus as set forth in claim 1 wherein the half field of view of said concentrator element is about 2° to about 40°.

9. Apparatus as set forth in claim 1 further including a substantially circular stop element centrally disposed within said collector element perpendicular to the optical axis of said collector element and having a solar energy reflective surface facing said energy trap means.

10. Apparatus for use in collection and utilization of solar energy, said apparatus comprising:

at least one generally conical-shaped, non-imaging solar energy concentrator element, said element including a substantially circular solar energy entrance aperture, a substantially circular solar energy exit aperture of lesser diameter than said entrance aperture, and solar energy reflective wall means extending from said entrance aperture to said exit aperture for directing solar energy entering the element at said entrance aperture toward said exit aperture, the profile curve of said wall means revealing symmetrical substantially concave curved segments;

a hollow solar energy trap means disposed at said exit aperture of said concentrator element; and a substantially circular stop element centrally disposed within said collector element perpendicular to the optical axis of said collector element and having a solar energy reflective surface facing said energy trap means.

* * * * *

UNITED STATES PATENT AND TRADEMARK OFFICE
CERTIFICATE OF CORRECTION

PATENT NO. : 3,899,672
DATED : August 12, 1975
INVENTOR(S) : RICCARDO LEVI-SETTI It is certified that error appears in the above-identified patent and that said Letters Patent are hereby corrected as shown below:

Col. 7, line 50 - "$\gamma$" should be --$\lambda$--

Col. 9, line 23 - please delete one set of quotes after the word "semi-angle"

Col. 11, line 50 - "$(P_o/P_{abs})$" should be --$(P_o/P_{abs})^{1/4}$--

Signed and Sealed this ninth Day of December 1975

[SEAL]

Attest:

RUTH C. MASON
*Attesting Officer*

C. MARSHALL DANN
*Commissioner of Patents and Trademarks*